Patented Dec. 29, 1925.

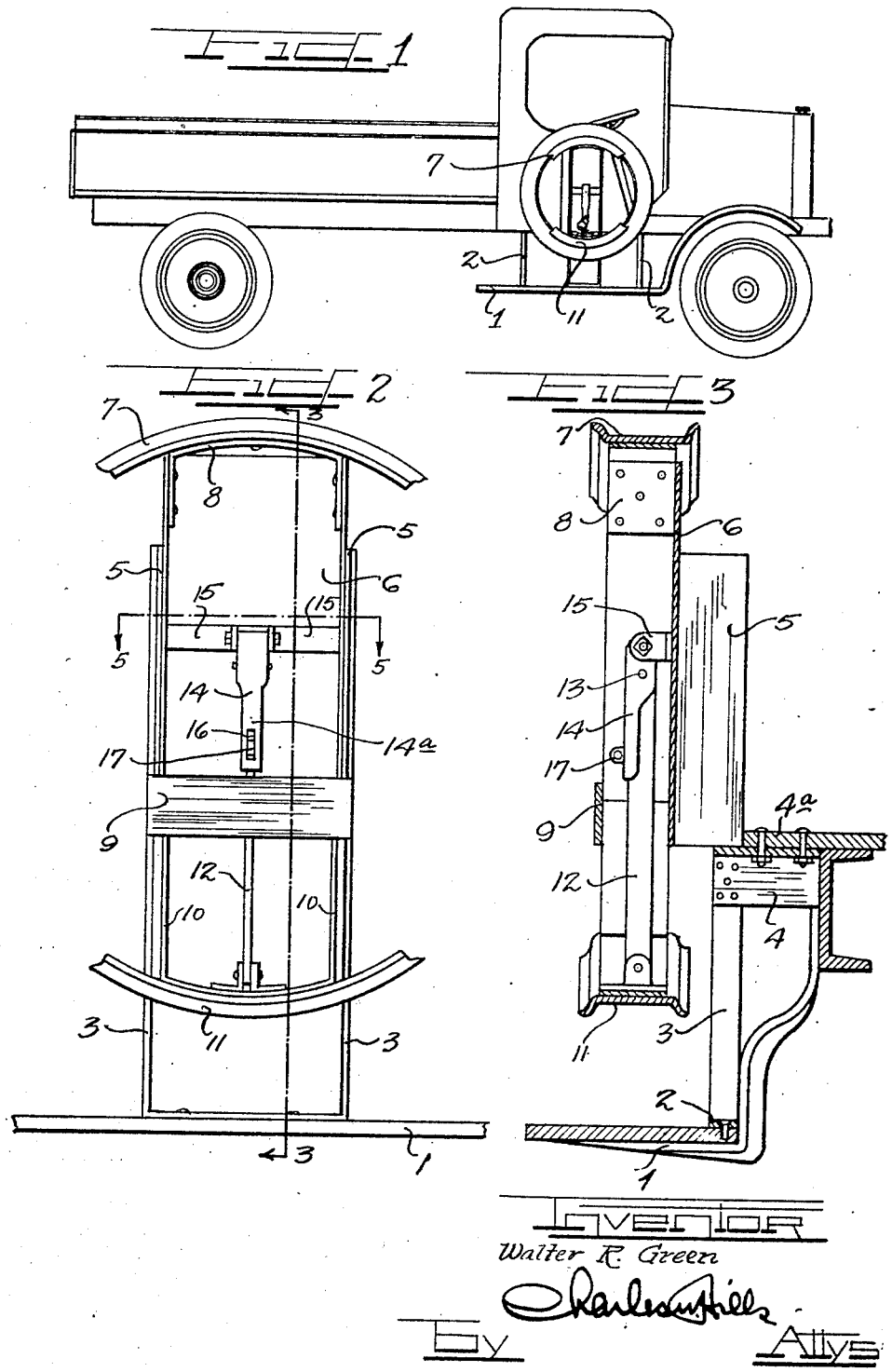

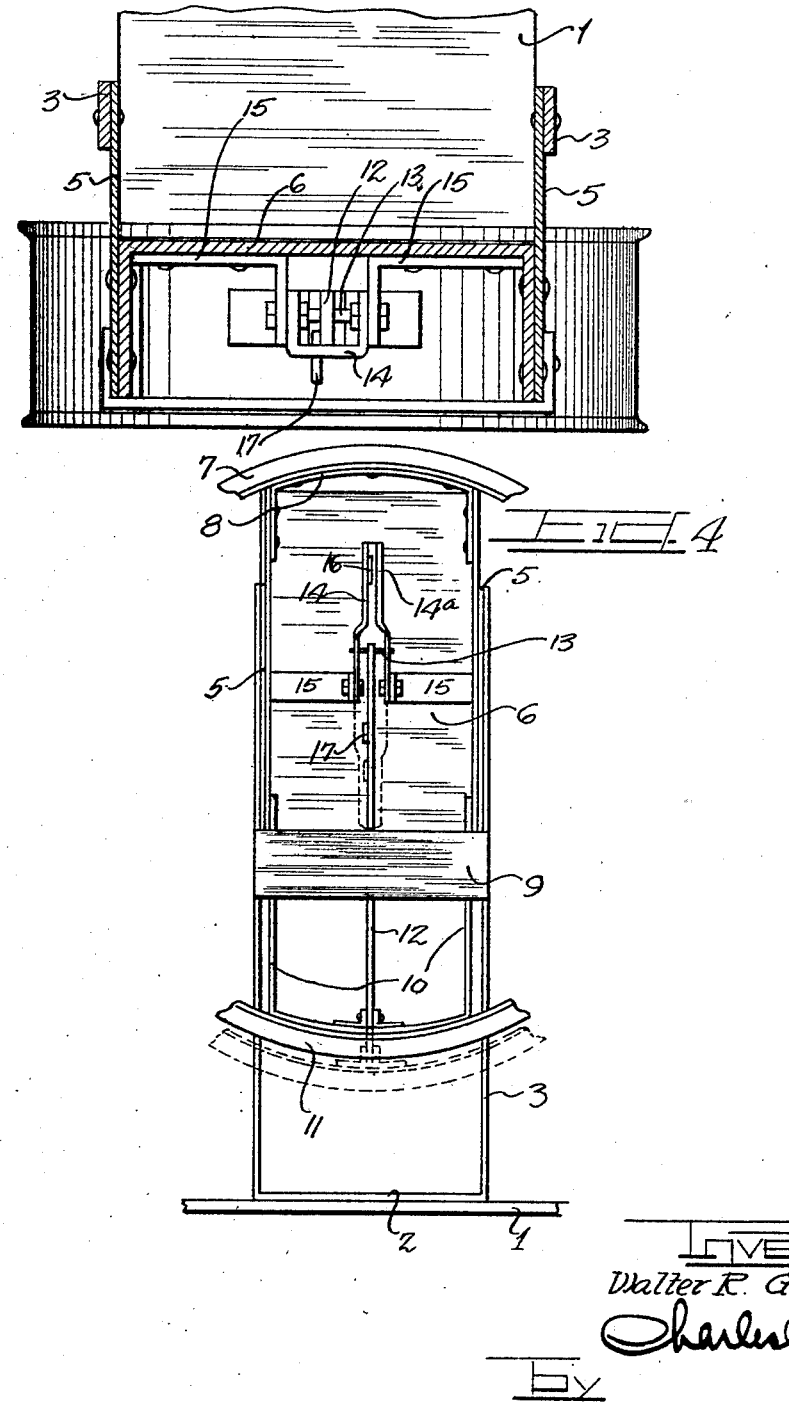

1,567,366

UNITED STATES PATENT OFFICE.

WALTER R. GREEN, OF CHICAGO, ILLINOIS.

TIRE CARRIER.

Application filed July 14, 1924. Serial No. 725,806.

*To all whom it may concern:*

Be it known that I, WALTER R. GREEN, a citizen of the United States, and a resident of the city of Chicago, in the county of Cook and State of Illinois, have invented certain new and useful Improvements in a Tire Carrier; and I do hereby declare that the following is a full, clear, and exact description of the same, reference being had to the accompanying drawings, and to the numerals of reference marked thereon, which form a part of this specification.

This invention relates to a tire carrier adapted for attachment to the running board of a vehicle preferably a truck or the like, and comprises a pair of members supported for relative sliding movement.

The invention consists of the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is an elevational view of a truck with my carrier applied thereto.

Figure 2 is an enlarged elevational view of the tire carrier per se.

Figure 3 is an enlarged sectional view upon the line 3—3 of Figure 2.

Figure 4 is a view similar to Figure 2 illustrating the operation of the carrier.

Figure 5 is an enlarged sectional view of the carrier upon the line 5—5 of Fig. 2.

Referring to the drawings which illustrate one embodiment of this invention there is shown the outlines of an automobile truck having a running board 1. A U-shaped support 2 is attached to the inner edge of the running board; the arms 3 thereof extending upward to form supports for the carrier. Angle brackets 4 attached to the arms and the projecting seat 4ª of the truck serve to rigidly connect and brace said arms in position. A plate 5 is attached to the upper end of each support 3.

A channel member 6 is secured between the plates 5 as shown in Figure 5. The web thereof extending between the plates 5 and the flanges thereof being attached to said plates. An arcuate tire retaining shoe 7 is secured upon the upper end of the channel 6 by means of a U-shaped bracket 8 having its arms riveted or bolted to the flanges of said channel. A relatively narrow guide channel member 9 is secured over the outer margins of the plates 5 at a suitable intermediate point, preferably at the lower end of the channel 6 whereby a box like enclosure is formed which forms a guideway for the arms 10 of a U-shaped support to which the lower arcuate tire retaining member 11 is secured.

A rod 12 is pivotally secured at its lower end to the lower tire retaining member 11. The upper end of said rod is pivoted to a pin 13 which spans the arms of a latching and operating member 14. The arms of this operating member are pivoted to angular lugs 15 which in turn are secured to the web of the channel member 6.

The operating member 14 is preferably formed from sheet metal which is constructed to provide lateral flanges which form the aforementioned arms. The upper handle part 14ª of this member is somewhat restricted and provided with a slot 16 adapted for receiving a hasp 17 or the like upon the rod 12 when the operating member is swung downwardly as shown in Figure 2 and in dotted lines in Figure 4. The downward swinging movements of the operating member 14 will adjust the lower arcuate shoe 11 downwardly to firmly clamp the tire thereon. A padlock or the like may then be locked upon the hasp 17 for locking the operating member 14 in its lowered or operative position and consequently locking the tire against removal from the carrier.

To place a tire upon the carrier, the operating member 14 is swung upwardly into the full line position shown in Figure 4. This will raise the lower shoe 11 so that a tire may be readily positioned thereon. When the tire has been properly positioned upon the carrier, the operating member or lever 14 may be swung downwardly to lower the shoe 11 and clamp the tire upon the carrier. The operating member will engage over the hasp 17 in its lowered position so that a padlock or the like may be applied thereto.

I am aware that numerous details of construction may be varied through a wide range without departing from the principles of this invention, and I therefore do not purpose limiting the patent granted otherwise than necessitated by the prior art.

I claim as my invention:

1. A tire carrier comprising a pair of supporting arms, a channel member secured to said arms, tire retaining shoe secured to the upper end of said channel member, a second channel member secured to said arms in opposed relation to the first channel member, a lower tire retaining shoe having arms slidably sustained between said arms and channel members, an operating member pivoted to the first channel member, and a link connecting said lower shoe and operating member for the purpose set forth.

2. A tire carrier comprising a pair of parallel supporting members, a channel member connected to said supporting members, a tire supporting shoe rigidly secured to one end of the channel member, means connecting the flanges of said channel member for forming a guideway, a second tire supporting shoe having arms slidably retained in said guideway, an operating member pivoted to said channel member, a link connecting said operating member and second shoe, and means for locking said link to said operating member.

3. In a tire carrier, a U shaped support adapted for attachement to the running board of a vehicle, a pair of parallel plate members secured to said support, a channel member secured between said plate members, a shoe secured to one end of said channel, a second shoe having spaced arms slidably extending between the flanges of said channel member, a lever pivoted to said channel member, a link connecting said lever and second shoe, and means for locking said link to said shoe.

4. In a tire carrier, a channel member, a shoe secured upon one end of the channel member, a second shoe having parallel arms slidably positioned in said channel member, an operating member connected to said channel member, a link connecting said second shoe and operating member, and means for locking said operating member to said link.

In testimony whereof I have hereunto subscribed my name.

WALTER R. GREEN.